(12) United States Patent
Yamamoto

(10) Patent No.: US 9,835,641 B2
(45) Date of Patent: *Dec. 5, 2017

(54) ANGULAR VELOCITY DETECTION DEVICE AND ANGULAR VELOCITY SENSOR INCLUDING THE SAME

(71) Applicant: Panasonic Intellectual Property Management Co., Ltd., Osaka (JP)

(72) Inventor: Kensaku Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 282 days.

This patent is subject to a terminal disclaimer.

(21) Appl. No.: 14/676,330

(22) Filed: Apr. 1, 2015

(65) Prior Publication Data

US 2015/0204897 A1 Jul. 23, 2015

Related U.S. Application Data

(63) Continuation of application No. 13/705,459, filed on Dec. 5, 2012, now Pat. No. 9,164,119, which is a
(Continued)

(30) Foreign Application Priority Data

Jun. 25, 2010 (JP) .................................. 2010-144642
Jun. 25, 2010 (JP) .................................. 2010-144643
(Continued)

(51) Int. Cl.
*G01C 19/56* (2012.01)
*G01P 3/02* (2006.01)
(Continued)

(52) U.S. Cl.
CPC ............ *G01P 3/02* (2013.01); *G01C 19/5719* (2013.01); *G01C 19/5733* (2013.01);
(Continued)

(58) Field of Classification Search
CPC ............ G01C 19/5733; G01C 19/5719; G01C 19/56; G01C 19/5783; G01C 19/5621;
(Continued)

(56) References Cited

U.S. PATENT DOCUMENTS 5,203,208 A * 4/1993 Bernstein ........... G01C 19/5719
73/504.12
5,226,321 A * 7/1993 Varnham ............ G01C 19/5684
73/504.13
(Continued)

FOREIGN PATENT DOCUMENTS

JP 06-123631 A 5/1994
JP 06-291334 A 10/1994
(Continued)

OTHER PUBLICATIONS

International Search Report for PCT/JP2011/003558 dated Sep. 6, 2011.

*Primary Examiner* — Helen Kwok
(74) *Attorney, Agent, or Firm* — Pearne & Gordon LLP

(57) ABSTRACT

An angular velocity detection device includes an outer frame including fixed portions, outer beam portions connected to the fixed portions, a sensing part surrounded by the outer frame with first slit therebetween, and a joint connecting the outer frame and the sensing part. The sensing part includes an inner beam portion, a flexible portion, and a detector. The inner beam portion has a hollow region inside and is square-shaped when viewed from above. The flexible portion is formed in the hollow region of the inner beam portion, and is connected to the inner edge of the inner beam
(Continued)

portion. The detector is disposed in the flexible portion. The first slit is formed to surround the sensing part excluding the joint.

25 Claims, 15 Drawing Sheets

Related U.S. Application Data continuation of application No. PCT/JP2011/003558, filed on Jun. 22, 2011.

(30) Foreign Application Priority Data

| | | | |
|---|---|---|---|
| Nov. 5, 2010 | (JP) | ................................ | 2010-248078 |
| Nov. 5, 2010 | (JP) | ................................ | 2010-248079 |
| Feb. 9, 2011 | (JP) | ................................ | 2011-025738 |

(51) Int. Cl.

| | |
|---|---|
| *G01C 19/5719* | (2012.01) |
| *G01C 19/5733* | (2012.01) |
| *G01P 15/12* | (2006.01) |
| *G01P 15/125* | (2006.01) |
| *G01P 15/18* | (2013.01) |
| *G01P 15/08* | (2006.01) |

(52) U.S. Cl.
CPC .......... *G01P 15/123* (2013.01); *G01P 15/125* (2013.01); *G01P 15/18* (2013.01); *G01P 2015/0842* (2013.01)

(58) Field of Classification Search
CPC .............. G01C 19/5607; G01C 19/574; G01C 19/5663; G01C 19/5747; G01C 19/5642; G01P 15/123; G01P 15/125; G01P 15/18; G01P 3/02
See application file for complete search history.

(56) References Cited

U.S. PATENT DOCUMENTS

| | | | |
|---|---|---|---|
| 5,734,105 A | 3/1998 | Mizukoshi | |
| 6,128,953 A | 10/2000 | Mizukoshi | |
| 6,470,747 B1 | 10/2002 | Mizukoshi | |
| RE42,359 E | 5/2011 | Mizukoshi | |
| 8,991,248 B2 * | 3/2015 | Imanaka | ............... G01C 19/574 |
| | | | 73/504.12 |
| 9,164,119 B2 * | 10/2015 | Yamamoto | ......... G01C 19/5733 |
| 9,400,180 B2 * | 7/2016 | Yamamoto | .......... H01L 41/0805 |
| 2008/0134781 A1 | 6/2008 | Noguchi et al. | |
| 2008/0216573 A1 | 9/2008 | Katou | |
| 2009/0064783 A1 * | 3/2009 | Ohuchi | ............... G01C 19/5607 |
| | | | 73/514.15 |
| 2009/0320597 A1 | 12/2009 | Hattori | |
| 2010/0071468 A1 * | 3/2010 | Ohuchi | ............... G01C 19/5719 |
| | | | 73/504.12 |
| 2010/0116051 A1 | 5/2010 | Uemura | |
| 2010/0126270 A1 * | 5/2010 | Terada | ............... G01C 19/5719 |
| | | | 73/504.12 |
| 2011/0203371 A1 * | 8/2011 | Ohuchi | .................. G01C 19/56 |
| | | | 73/504.12 |
| 2012/0227489 A1 | 9/2012 | Imanaka et al. | |
| 2013/0239681 A1 * | 9/2013 | Fujii | .................. G01C 19/5719 |
| | | | 73/504.12 |
| 2016/0231111 A1 * | 8/2016 | Yamamoto | ......... G01C 19/5628 |

FOREIGN PATENT DOCUMENTS

| | | |
|---|---|---|
| JP | 06-345495 A | 12/1994 |
| JP | 2005-337874 A | 12/2005 |
| JP | 2007-085800 A | 4/2007 |
| JP | 2007-108044 A | 4/2007 |
| JP | 2008-224294 A | 9/2008 |
| JP | 2010-008128 A | 1/2010 |
| WO | 2008/096528 | 8/2008 |
| WO | 2008/102535 A1 | 8/2008 |
| WO | 2008/129865 A1 | 10/2008 |
| WO | WO 2008/129865 * | 10/2008 |
| WO | WO 2009/034682 * | 3/2009 |
| WO | 2011/093077 A1 | 8/2011 |

* cited by examiner

FIG. 2
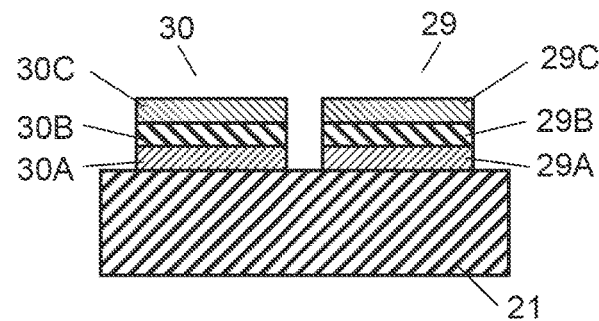
FIG. 3
| | | phase of drive signal | phase of vibration of the arm |
|---|---|---|---|
| arm 21 | driver 29 | + | + |
| | driver 30 | − | |
| arm 22 | driver 31 | + | − |
| | driver 32 | − | |
| arm 23 | driver 33 | + | + |
| | driver 34 | − | |
| arm 24 | driver 35 | + | − |
| | driver 36 | − | |
FIG. 4
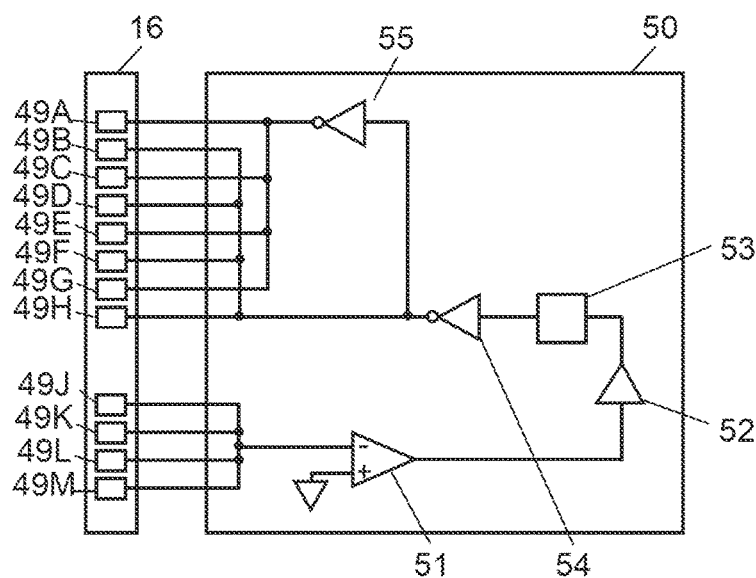

FIG. 7

|  | drive | AV-X | AV-Y | AV-Z | A-X | A-Y | A-Z |
|---|---|---|---|---|---|---|---|
| S1 (signal output from detector 41) | + | + | + | - | + | - | + |
| S2 (signal output from detector 42) | - | + | + | + | - | + | + |
| S3 (signal output from detector 43) | + | + | - | + | - | - | + |
| S4 (signal output from detector 44) | - | + | - | - | + | + | + |
| S5 (signal output from detector 45) | + | - | + | + | + | + | + |
| S6 (signal output from detector 46) | - | - | + | - | - | - | + |
| S7 (signal output from detector 47) | + | - | - | - | - | + | + |
| S8 (signal output from detector 48) | - | - | - | + | + | - | + |
| Mathematical Formula (1) | 0 | 0 | 0 | 8+ | 0 | 0 | 0 |
| Mathematical Formula (2) | 0 | 0 | 8+ | 0 | 0 | 0 | 0 |
| Mathematical Formula (3) | 0 | 8+ | 0 | 0 | 0 | 0 | 0 |

AV-X: angular velocity around the X axis
AV-Y: angular velocity around the Y axis
AV-Z: angular velocity around the Z axis
A-X: acceleration in the X axis direction
A-Y: acceleration in the Y axis direction
A-Z: acceleration in the Z axis direction

FIG. 11

|  | drive | AV-X | AV-Y | AV-Z | A-X | A-Y | A-Z |
|---|---|---|---|---|---|---|---|
| S9 (signal output from detector 76) | 0 | + | 0 | 0 | + | 0 | + |
| S10 (signal output from detector 77) | 0 | - | 0 | 0 | + | 0 | + |
| S11 (signal output from detector 78) | 0 | + | 0 | 0 | - | 0 | + |
| S12 (signal output from detector 79) | 0 | - | 0 | 0 | - | 0 | + |
| Mathematical Formula (4) | 0 | 4+ | 0 | 0 | 0 | 0 | 0 |

AV-X: angular velocity around the X axis
AV-Y: angular velocity around the Y axis
AV-Z: angular velocity around the Z axis
A-X: acceleration in the X axis direction
A-Y: acceleration in the Y axis direction
A-Z: acceleration in the Z axis direction

FIG. 13

|  | drive | AV-X | AV-Y | AV-Z | A-X | A-Y | A-Z |
|---|---|---|---|---|---|---|---|
| S13 (signal output from detector 81) | 0 | 0 | + | 0 | 0 | + | + |
| S14 (signal output from detector 82) | 0 | 0 | - | 0 | 0 | + | + |
| S15 (signal output from detector 83) | 0 | 0 | + | 0 | 0 | - | + |
| S16 (signal output from detector 84) | 0 | 0 | - | 0 | 0 | - | + |
| Mathematical Formula (5) | 0 | 0 | 4+ | 0 | 0 | 0 | 0 |

AV-X: angular velocity around the X axis
AV-Y: angular velocity around the Y axis
AV-Z: angular velocity around the Z axis
A-X: acceleration in the X axis direction
A-Y: acceleration in the Y axis direction
A-Z: acceleration in the Z axis direction

ANGULAR VELOCITY DETECTION DEVICE AND ANGULAR VELOCITY SENSOR INCLUDING THE SAME

CROSS-REFERENCE TO RELATED APPLICATIONS

This application is a continuation of U.S. patent application Ser. No. 13/705,459 filed on Dec. 5, 2012, which is a by-pass continuation of PCT/JP2011/003558 filed on Jun. 22, 2011, which claims priority to Japanese Patent Application Nos. 2010-144642 and 2010-144643 filed on Jun. 25, 2010; 2010-248078 and 2010-248079 filed on Nov. 5, 2010; and 2011-025738 filed on Feb. 9, 2011.

BACKGROUND

1. Technical Field

The technical field relates to an angular velocity sensor for use in, for example, a mobile device or a vehicle, and to an angular velocity detection device included in the sensor.

2. Background Art

FIG. 17 is a perspective view of an angular velocity detection device used in a conventional angular velocity sensor. Angular velocity detection device 1 includes frame body 2, transverse beam 3, arms 4, 5, 6, and 7, weights 8, 9, 10, and 11, driver 12, monitor 13, and detectors 14, 15. Transverse beam 3 is suspended by frame body 2 in the direction of the X axis where the X, Y, and Z axes are orthogonal to each other. One end of each of arms 4 and 5 is supported by transverse beam 3 and arms 4 and 5 extend in the positive direction of the Y axis. Weights 8 and 9 are disposed at another end of each of arms 4 and 5, respectively. One end of each of arms 6 and 7 is supported by transverse beam 3 and arms 6 and 7 extend in the negative direction of the Y axis. Weights 10 and 11 are disposed at another end of each of arms 6 and 7, respectively. Driver 12 applies an AC voltage to arm 4 so as to generate a piezoelectric effect, thereby vibrating arm 4 in the direction of the X axis. This vibration causes arms 5, 6, and 7 to resonate in the direction of the X axis. Monitor 13 detects the displacements of arms 4, 5, 6, and 7 in the direction of the X axis. Detectors 14 and 15 output sensing signals, which are generated on arms 6 and 7 due to the piezoelectric effect and are caused by the Coriolis force when an angular velocity is applied to angular velocity detection device 1. From these sensing signals, displacements in the direction of the Y or Z axis are detected.

SUMMARY

The angular velocity detection device includes an outer frame including a fixed portion and an outer beam portion connected to the fixed portion; a sensing part surrounded by the outer frame with a first slit therebetween; and a joint connecting the outer frame to the sensing part. The sensing part includes an inner beam portion, a flexible portion, and a detector. The inner beam portion has a hollow region inside and is square-shaped when viewed from above. The flexible portion is disposed in the hollow region of the inner beam portion, and connected to the inner edge of the inner beam portion. The detector is disposed in the flexible portion. The first slit is formed to surround the sensing part excluding the joint.

BRIEF DESCRIPTION OF DRAWINGS

FIG. 2 is a sectional view of an essential part of the angular velocity detection device shown in FIG. 1A.

FIG. 3 shows the relationship between the phases of drive signals and the phases of vibrations of the arms of the angular velocity detection device shown in FIG. 1A.

FIG. 4 shows the relation of connection between the angular velocity detection device shown in FIG. 1A and a driving circuit.

FIG. 7 shows phases of signals to be output from detectors of the angular velocity detection device shown in FIG. 1A.

FIG. 11 shows phases of signals to be output from detectors of the angular velocity detection device shown in FIG. 10.

FIG. 13 shows phases of signals to be output from detectors of the angular velocity detection device shown in FIG. 12.

DETAILED DESCRIPTION OF PREFERRED EMBODIMENTS

Figure 17:
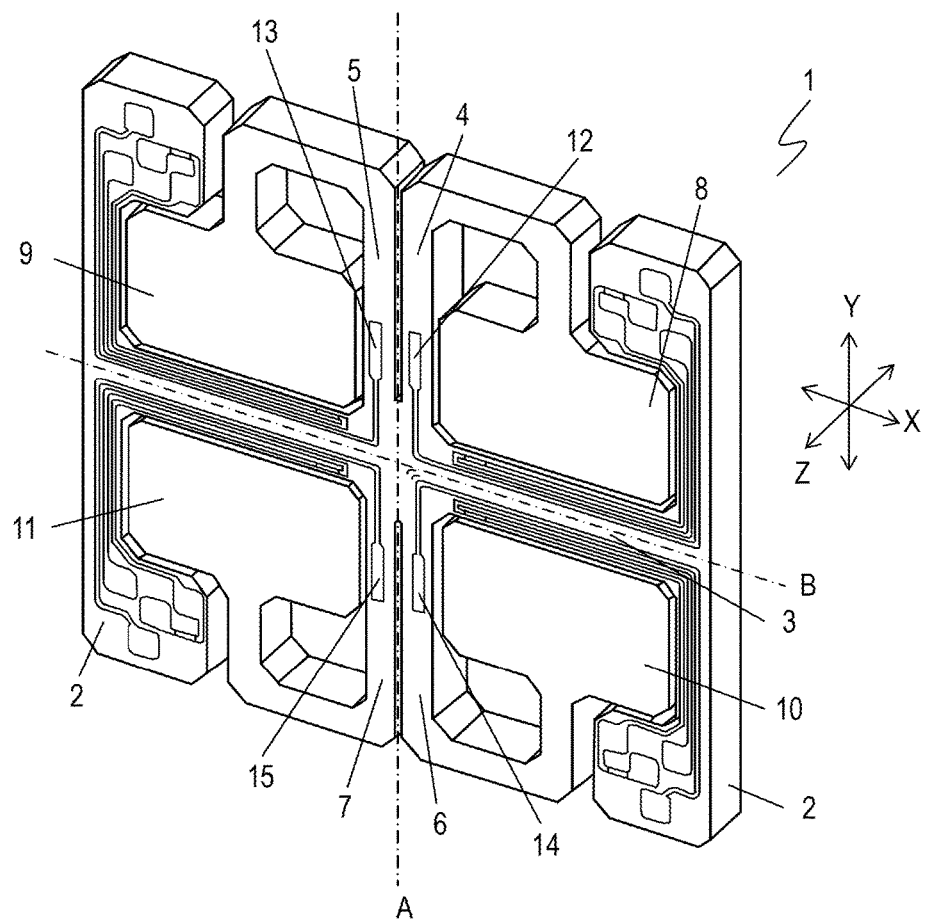
FIG. 17 is a perspective view of a conventional angular velocity detection device.

Before the detailed discussion of exemplary embodiments, problems of the conventional angular velocity detection device will be described. In angular velocity detection device 1 shown in FIG. 17, detectors 14 and 15 are not disposed symmetrically with respect to both axes "A" and "B", which are parallel to the Y and X axes, respectively. This makes it impossible to cancel unwanted signals due to external disturbance such as acceleration or impact, causing the detection accuracy of the angular velocity to be low. Moreover, an external stress applied to angular velocity detection device 1 acts on transverse beam 3 so as to cause unwanted vibration on arms 4, 5, 6, and 7, thereby fluctuating outputs of detectors 14 and 15.

Referring now to the drawings, description will be provided of exemplary embodiments of an angular velocity detection device and an angular velocity sensor including the device. In these embodiments, the same components as in the preceding embodiments are denoted by the same reference numerals, and the detailed description thereof may be omitted.

Exemplary Embodiments

Figure 1A:
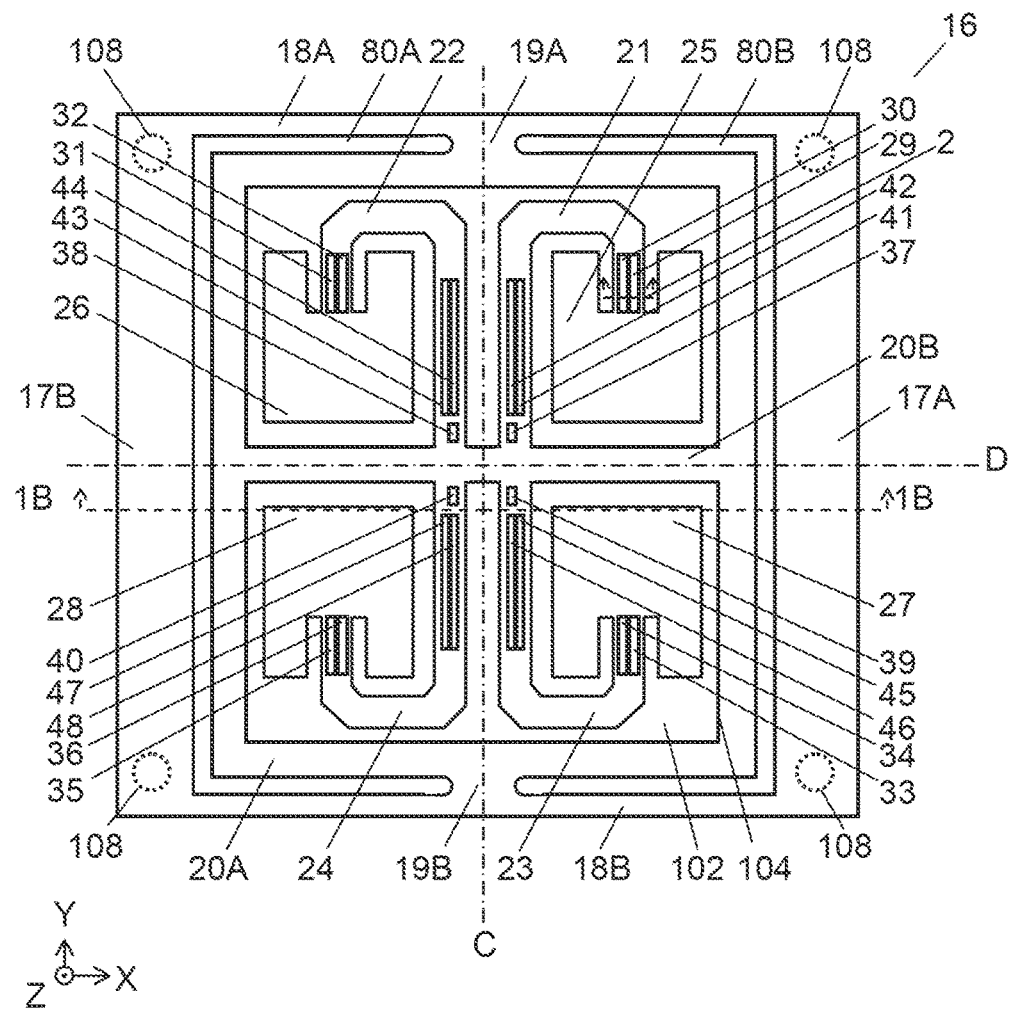
FIG. 1A is a top view of an angular velocity detection device according to an embodiment.
Figure 1B:
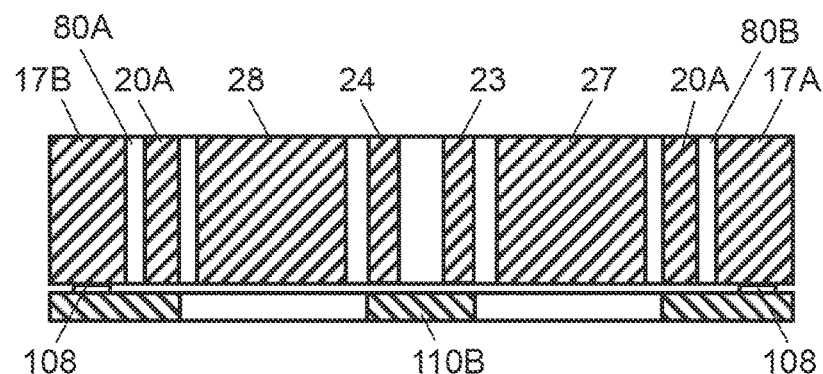
FIG. 1B is a sectional view of the angular velocity detection device shown in FIG. 1A.

FIG. 1A is a top view of angular velocity detection device 16 (hereinafter referred as device 16) according to an embodiment. FIG. 1B is a sectional view of device 16, taken along line 1B-1B of FIG. 1A. Device 16 includes an outer frame including fixed portions 17A and 17B, and outer beam portions 18A and 18B connected to fixed portions 17A and 17B. Device 16 further includes a sensing part surrounded by the outer frame with first slits 80A and 80B therebetween, and joints 19A and 19B connecting the outer frame and the sensing part. First slits 80A and 80B are formed to surround the sensing part excluding joints 19A and 19B.

The sensing part includes inner beam portion 20A, central beam portion 20B, first arm 21, second arm 22, third arm 23, fourth arm 24 (hereinafter, arms 21 to 24), drivers 29 to 36, and detectors 41 to 48. The sensing part further includes weights 25 to 28 disposed at an end of each of first to fourth arms 21, 22, 23, and 24, respectively.

Inner beam portion 20A is square-shaped when viewed from above. Central beam portion 20B connects the opposite sides of inner beam portion 20A, and is parallel to outer beam portion 18A. Arms 21 to 24 are disposed inside inner beam portion 20A and connected to central beam portion 20B.

Thus, fixed portions 17A, 17B, outer beam portions 18A, 18B, and inner beam portion 20A together form a frame part having a top surface (first surface) and a bottom surface (second surface), and also having inner edge 104 and hollow region 102 inside the frame part. As shown in FIG. 1B, lower support body 110B is disposed so as to confront the bottom surface of the frame part. Lower support body 110B is bonded to fixed portions 17A and 17B via adhesive portions 108. Central beam portion 20B, arms 21 to 24, and weights 25 to 28 are disposed in hollow region 102 of the frame part, thereby forming a flexible portion connected to inner edge 104 of the frame part. First slits 80A and 80B surrounding inner beam portion 20A are through-holes disposed between adhesive portions 108 of the frame part and the flexible portion.

Adhesive portions 108 are formed at the four corners of the outer frame in FIG. 1A, but may alternatively extend long between outer beam portions 18A, 18B along fixed portions 17A, 17B, or extend along outer beam portions 18A, 18B.

As shown in FIG. 1B, the frame part and lower support body 110B are separated by the thickness of adhesive portions 108. This configuration can reduce the stress when the frame part and lower support body 110B are bonded to each other, thereby reducing the residual stress accumulated in the flexible portion. As a result, the sensitivity of device 16 is prevented from degrading over time.

Arm 22 is disposed on the same side as arm 21 with respect to central beam portion 20B, and is line-symmetrical to arm 21. More specifically, arm 22 is symmetrical to arm 21 with respect to axis "C", which is at right angles to central beam portion 20B. Axis "C" is parallel to the Y axis.

Arm 23 is disposed on the opposite side of arm 21 with respect to central beam portion 20B, and is line-symmetrical to arm 21. More specifically, arm 23 is symmetrical to arm 21 with respect to axis "D", which passes through the center of central beam portion 20B. Axis "D" is parallel to the X axis.

Arm 24 is disposed on the same side as arm 23 with respect to central beam portion 20B, and is line-symmetrical to arm 23. More specifically, arm 24 is symmetrical to arm 23 with respect to axis "C". Thus, arms 21 and 22 extend in the positive direction of the Y axis, whereas arms 23 and 24 extend in the negative direction of the Y axis.

Drivers 29, 30 and detectors 41, 42 are disposed on arm 21. Drivers 31, 32 and detectors 43, 44 are disposed on arm 22. Drivers 33, 34 and detectors 45, 46 are disposed on arm 23. Drivers 35, 36 and detectors 47, 48 are disposed on arm 24. Drivers 29 to 36 drive arms 21 to 24 in the X axis direction. Detectors 41 to 48 detect the displacements of weights 25 to 28 disposed on arms 21 to 24, respectively, in the Y or Z axis direction.

Device 16 further includes monitors 37 to 40 in the vicinity of the regions where arms 21 to 24 are connected to central beam portion 20B. Monitors 37 to 40 detect the displacements of arms 21 to 24 in the X axis direction.

Each component of angular velocity detection device 16 is now described as follows. Fixed portions 17A and 17B support outer beam portions 18A and 18B. Specifically, fixed portions 17A and 17B are formed parallel to the Y axis, and both ends of them are connected to outer beam portions 18A and 18B, thereby forming an outside frame body. Fixed portions 17A and 17B are fixed, using a support member or an adhesive, in a package (not shown) where device 16 is stored. Fixed portions 17A and 17B includes electrode pads (not shown) at their outer edges. These electrode pads are electrically connected to drivers 29 to 36, monitors 37 to 40, and detectors 41 to 48 by wires (not shown).

Inner beam portion 20A has two sides parallel to the Y axis and two sides parallel to the X axis, thereby forming an inside frame body. Those two sides of inner beam portion 20A that are parallel to the Y axis can bend in the Z axis direction, and are substantially symmetrical to each other with respect to axis "C" parallel to the Y axis. As a result, the two sides of inner beam portion 20A that are parallel to the Y axis bend with a substantially equal amplitude in response to an angular velocity applied to device 16. The two sides of inner beam portion 20A that are parallel to the X axis are connected at their substantial centers to outer beam portions 18A and 18B via joints 19A and 19B.

Central beam portion 20B is parallel to the X axis, and is connected to substantial midpoints of the two sides of inner beam portion 20A that are parallel to the Y axis. As a result, central beam portion 20B can bend in the Z axis direction.

Arm 21 extends in the positive direction of the Y axis from one end thereof connected to central beam portion 20B; extends in the positive direction of the X axis from the first joint; and extends in the negative direction of the Y axis from the second joint, thus forming the shape of the letter "J". At the other end of arm 21, weight 25 is disposed.

Arm 22 extends in the positive direction of the Y axis from one end thereof connected to central beam portion 20B; extends in the negative direction of the X axis from the first joint; and extends in the negative direction of the Y axis from the second joint, thus forming the shape of the letter "J". At the other end of arm 22, weight 26 is disposed.

Arm 23 extends in the negative direction of the Y axis from one end thereof connected to central beam portion 20B; extends in the positive direction of the X axis from the first joint; and extends in the positive direction of the Y axis from the second joint, thus forming the shape of the letter "J". At the other end of arm 23, weight 27 is disposed.

Arm 24 extends in the negative direction of the Y axis from one end thereof connected to central beam portion 20B; extends in the negative direction of the X axis from the first joint; and extends in the positive direction of the Y axis from the second joint, thus forming the shape of the letter "J". At the other end of arm 24, weight 28 is disposed. Arms 21 to 24 are connected to weights 25 to 28, respectively, at the recessed center of one side of each of weights 25 to 28 having a substantially square shape. Arms 21 to 24 can bend in the X, Y, and Z axes directions.

Arms 21 and 22 are symmetrical with respect to axis "C" parallel to the Y axis. Arms 23 and 24 are also symmetrical with respect to axis "C". Arms 21 and 23 are symmetrical with respect to axis "D" parallel to the X axis. Arms 22 and 24 are also symmetrical with respect to axis "D". Disposed to be symmetrical with respect to axes "C" and "D", arms 21 to 24 bend with a substantially equal amplitude in response to an angular velocity applied to device 16.

Fixed portions 17A, 17B, outer beam portions 18A, 18B, inner beam portion 20A, central beam portion 20B, and arms 21 to 24 are made of a piezoelectric material such as crystal, $LiTaO_3$, and $LiNBO_3$. These portions can alternatively be made of a non-piezoelectric material such as silicon, diamond, fused silica, alumina, and GaAs. Using silicon enables these portions to be miniaturized by micro processing technology and be integrated into an IC or other circuit.

Fixed portions 17A, 17B, outer beam portions 18A, 18B, inner beam portion 20A, central beam portion 20B, and arms 21 to 24 may be made of the same or different materials from each other and then assembled, or may be integrally formed from the same material. In the case of forming integrally from the same material, dry or wet etching can be used to form fixed portions 17A, 17B, outer beam portions 18A, 18B, inner beam portion 20A, central beam portion 20B, and arms 21 to 24 efficiently in the same process.

Drivers 29 to 36 drive arms 21 to 24 in the X axis direction. Drivers 29 to 36 are of piezoelectric type using piezoelectric elements in the embodiment, but may alternatively be of capacitance type using the capacitance between electrodes.

FIG. 2 is a schematic sectional view of drivers 29 and 30, taken along line 2 of FIG. 1A. Driver 29 includes lower electrode 29A, upper electrode 29C, and piezoelectric element 29B sandwiched between these electrodes. Driver 30 includes lower electrode 30A, upper electrode 30C, and piezoelectric element 30B sandwiched between these electrodes. Drivers 29 and 30 are disposed parallel to each other on the top surface of arm 21.

Lower electrodes 29A, 30A and upper electrodes 29C, 30C are made of platinum (Pt), gold (Au), aluminum (Al), or an alloy or oxide containing one of them as a main component. Lower electrodes 29A and 30A are preferably made of Pt. In the case of using Pt, lead zirconate titanate (PZT), which is contained in piezoelectric elements 29B and 30B, can be oriented in one direction. Upper electrodes 29C and 30C are preferably made of Au. In the case of using Au, the resistance hardly degrades over time, allowing device 16 to be highly reliable.

Lower electrodes 29A and 30A are reference potential electrodes. Applying an AC driving voltage to upper electrodes 29C and 30C can vibrate arm 21 in the X axis direction. An AC driving voltage can be applied to both lower electrodes 29A, 30A and upper electrodes 29C, 30C to make the drive efficiency higher.

Drivers 31 to 36, which have the same structure as drivers 29 and 30, are disposed on the top surfaces of arms 22 to 24, respectively. As shown in FIG. 1A, drivers 29 to 36 are preferably disposed near weights 25 to 28 in arms 21 to 24 having a substantially J shape. With this arrangement, those regions of arms 21 to 24 near central beam portion 20B can be used for detectors 41 to 48. On the other hand, in the case where drivers 29 to 36 are disposed in those regions of arms 21 to 24 near central beam portion 20B, drivers 29 to 36 can have a high drive efficiency and a large area. This results in an increase in the amplitude of arms 21 to 24, allowing device 16 to have a high sensitivity.

FIG. 3 shows the relationship between the phases of the drive signals given to drivers 29 to 36 and the phases of vibrations of arms 21 to 24. Drivers 29, 31, 33, and 35 are given drive signals of the same phase (+), whereas drivers 30, 32, 34, and 36 are given drive signals of the opposite phase (−) to it. As a result, arms 21, 23 vibrate at the same phase (+), whereas arms 22, 24 vibrate at the opposite phase (−) to it in the X axis direction.

Monitors 37 to 40 detect the displacements of arms 21 to 24 in the X axis direction. Monitors 37 to 40 are of piezoelectric type using piezoelectric elements in the embodiment like drivers 29 and 30 shown in FIG. 2, but may alternatively be of capacitance type using the capacitance between electrodes.

Monitors 37 to 40 are disposed on the top surfaces of arms 21 to 24. More specifically, monitors 37 to 40 are disposed in those regions of the top surfaces of arms 21 to 24 where they can receive monitor signals of the same phase as the vibrations of arms 21 to 24 shown in FIG. 3. Monitors 37 to 40 can efficiently detect distortion in spite of their small area by being disposed in the regions of arms 21 to 24 having a substantially J shape near central beam portion 20B as shown in FIG. 1A. Monitors 37 to 40 are preferably smaller in area than detectors 41 to 48 in order to secure the area for detectors 41 to 48.

Detectors 41 to 48 detect the displacements of arms 21 to 24 in the Y or Z axis direction. Detectors 41 to 48 are of piezoelectric type using piezoelectric elements like drivers 29 and 30 shown in FIG. 2, but may alternatively be of capacitance type using the capacitance between electrodes.

Detectors 41 to 48 are disposed on the top surfaces of arms 21 to 24. As shown in FIG. 1A, detectors 41 to 48 can be disposed in those regions of arms 21 to 24 having a substantially J shape near central beam portion 20B. With this arrangement, detectors 41 to 48 can have a high detection efficiency, and a large area, allowing device 16 to have a high sensitivity. On the other hand, in the case where detectors 41 to 48 are disposed in those regions of arms 21 to 24 near weights 25 to 28, those regions of arms 21 to 24 near central beam portion 20B can be used for drivers 29 to 36.

Detectors 41, 42 and detectors 43, 44 are symmetrical with respect to axis "C" parallel to the Y axis, whereas detectors 45, 46 and detectors 47, 48 are symmetrical with respect to axis "C". Detectors 41, 42 and detectors 45, 46 are symmetrical with respect to axis "D" parallel to the X axis, whereas detectors 43, 44 and detectors 47, 48 are symmetrical with respect to axis "D". The arrangement of detectors 41 to 48 symmetrically with respect to axes "C" and "D" can cancel unwanted signals due to external disturbance such as acceleration and impact, allowing accurate detection of an angular velocity.

First slits 80A and 80B are formed in such a manner as to surround the sensing part excluding joints 19A and 19B. In short, the sensing part is suspended by joints 19A and 19B. For this reason, when fixed portions 17A, 17B and/or outer beam portions 18A, 18B are subjected to a stress, causing device 16 to be pulled in the X axis direction, or causing fixed portions 17A, 17B and/or outer beam portions 18A, 18B to be bent, the stress is not easily transferred to the sensing part. This reduces the effect of the external stress on the sensing part, thereby reducing fluctuations in the output of detectors 41 to 48 when an external stress is applied to device 16. Specifically, in the case where device 16 has a size of about 2.5×2.5 mm and its base is made of 150 μm thick silicon (Si), the influence of the stress on the sensing part is reduced to about one third. This effect is provided independently of the effect of the arrangement of detectors 41 to 48.

The following is a description of a driving circuit and a detecting circuit which are connected to device 16. Specifically, the following description is focused on the improvement in the detection accuracy of an angular velocity achieved by the arrangement of detectors 41 to 48 symmetrically with respect to axes "C" and "D".

FIG. 4 shows the relation of connection between angular velocity detection device 16 and driving circuit 50, which includes I-V conversion amplifier 51, AGC (Auto Gain Control) 52, filter 53, and drive amplifiers 54, 55. Electrode pads 49A to 49H, which are part of electrode pads formed in fixed portions 17A and 17B, are electrically connected to drivers 29 to 36, respectively, and electrode pads 49J to 49M are electrically connected to monitors 37 to 40, respectively.

Electrode pads 49J to 49M output monitor signals. The monitor signals are connected together, converted into a voltage by I-V conversion amplifier 51, adjusted to have a constant amplitude by AGC 52, separated from unwanted frequency components by filter 53, inverted and amplified by drive amplifier 54, and supplied to electrode pads 49B, 49D, 49F, and 49H. Drive amplifier 54 outputs a drive signal. The drive signal is inverted and amplified by drive amplifier 55, and supplied to electrode pads 49A, 49C, 49E, and 49G. With this configuration, driving circuit 50 can provide the drive signals having the phases shown in FIG. 3 to drivers 29 to 36, thereby vibrating arms 21 to 24 in the phases shown in FIG. 3.

Figure 5:
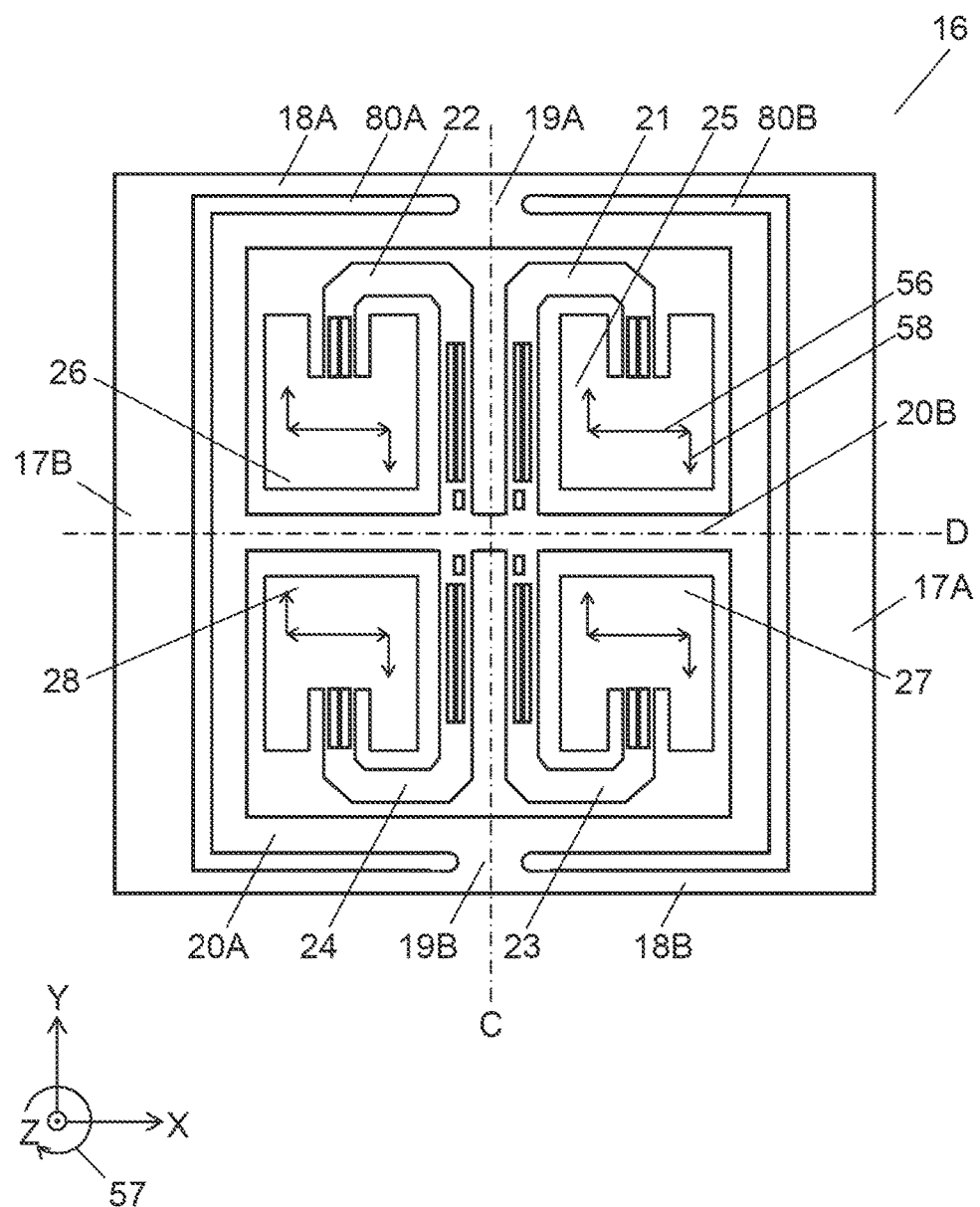
FIG. 5 is a top view showing a behavior of the angular velocity detection device shown in FIG. 1A when an angular velocity around the Z axis is applied thereto.
Figure 6:
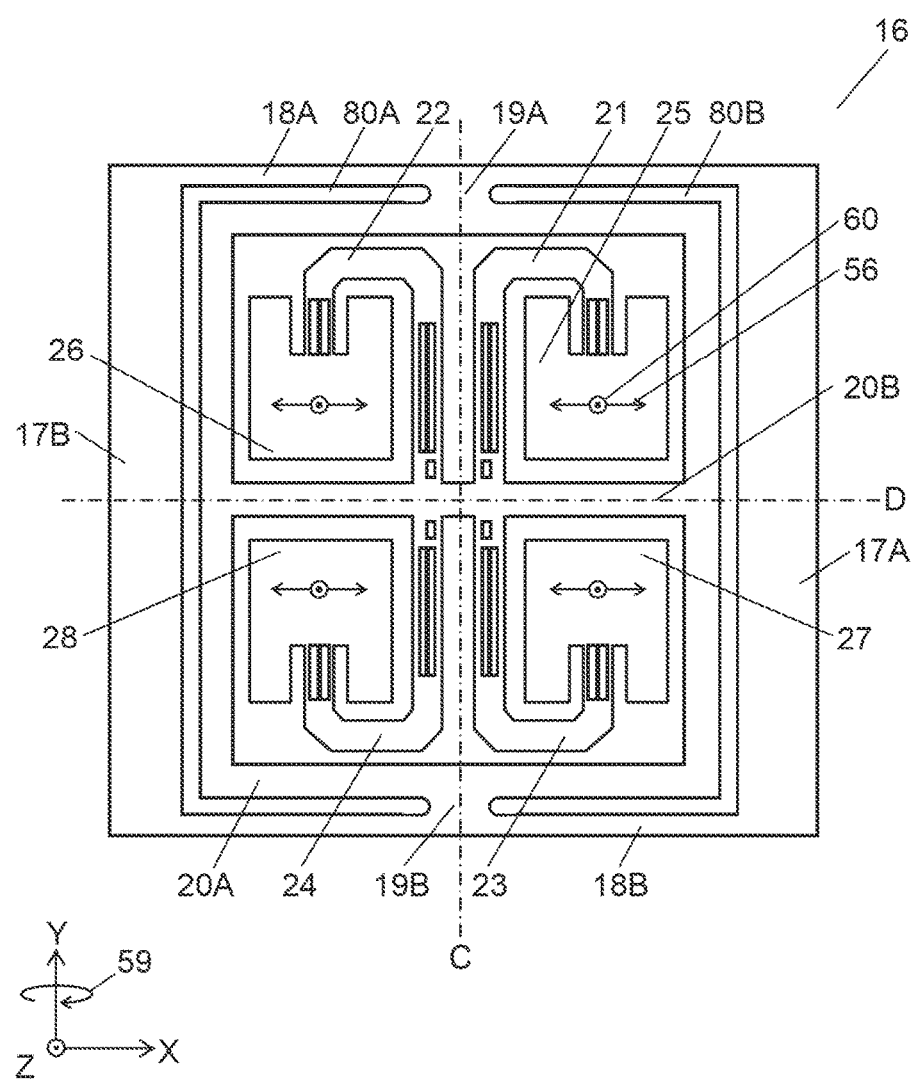
FIG. 6 is a top view showing a behavior of the angular velocity detection device shown in FIG. 1A when an angular velocity around the Y axis is applied thereto.

FIGS. 5 and 6 are top views showing behaviors of angular velocity detection device 16 when an angular velocity is applied thereto. FIG. 5 shows the case of detecting an angular velocity around the Z axis. When driving circuit 50 provides drive signals to drivers 29 to 36 in device 16, drive oscillation 56 is generated at a unique drive oscillation frequency in the X axis direction. When angular velocity 57 around the Z axis is applied to device 16, Coriolis force is generated on weights 25 to 28 in the Y axis direction, thereby generating detection oscillation 58. Detection oscillation 58 generated in weights 25 to 28 in the Y axis direction allows arms 21 to 24 to vibrate in the X axis direction. Arms 21 and 23 perform drive oscillation in anti-phase with arms 22 and 24, therefore detection oscillation of arms 21 and 23 is in anti-phase with that of arms 22 and 24.

Detection oscillation 58 allows detectors 41 to 48 to output detection signals that have the same frequency as drive oscillation 56 and that also have an amplitude dependent on angular velocity 57. Thus, measuring the magnitude of the detection signals results in detecting the magnitude $\omega_z$ of angular velocity 57.

FIG. 6 shows the case of detecting an angular velocity around the Y axis. In response to angular velocity 59 around the Y axis, Coriolis force generates detection oscillation 60 on weights 25 to 28 in the Z axis direction. Arms 21 and 23 perform drive oscillation in anti-phase with arms 22 and 24, therefore detection oscillation of arms 21 and 23 is in anti-phase with that of arms 22 and 24.

Detection oscillation 60 allows detectors 41 to 48 to output detection signals that have the same frequency as drive oscillation 56 and that also have an amplitude dependent on angular velocity 59. Thus, measuring the magnitude of the detection signals results in detecting the magnitude $\omega_y$ of angular velocity 59.

FIG. 7 shows phases of signals to be output from detectors 41 to 48 of angular velocity detection device 16. The signals to be output from detectors 41 to 48 are referred to as S1 to S8, respectively. FIG. 7 specifically shows the following: the phases of the drive signals of the detectors; the phases in the case where angular velocities are applied around the X, Y, and Z axes; and the phases in the case where accelerations are applied in the X, Y, and Z axes directions, with respect to the phases of the drive signals provided by driving circuit 50.

From FIG. 7, the magnitude $\omega_z$ of angular velocity 57 around the Z axis can be calculated by Mathematical Formula (1)

$$\omega_z = \{(S2+S5)+(S3+S8)\} - \{(S1+S6)+(S4+S7)\} \quad (1)$$

The magnitude $\omega_y$ of angular velocity 59 around the Y axis can be calculated by Mathematical Formula (2)

$$\omega_y = \{(S2+S5)+(S1+S6)\} - \{(S3+S8)+(S4+S7)\} \quad (2)$$

Figure 8:
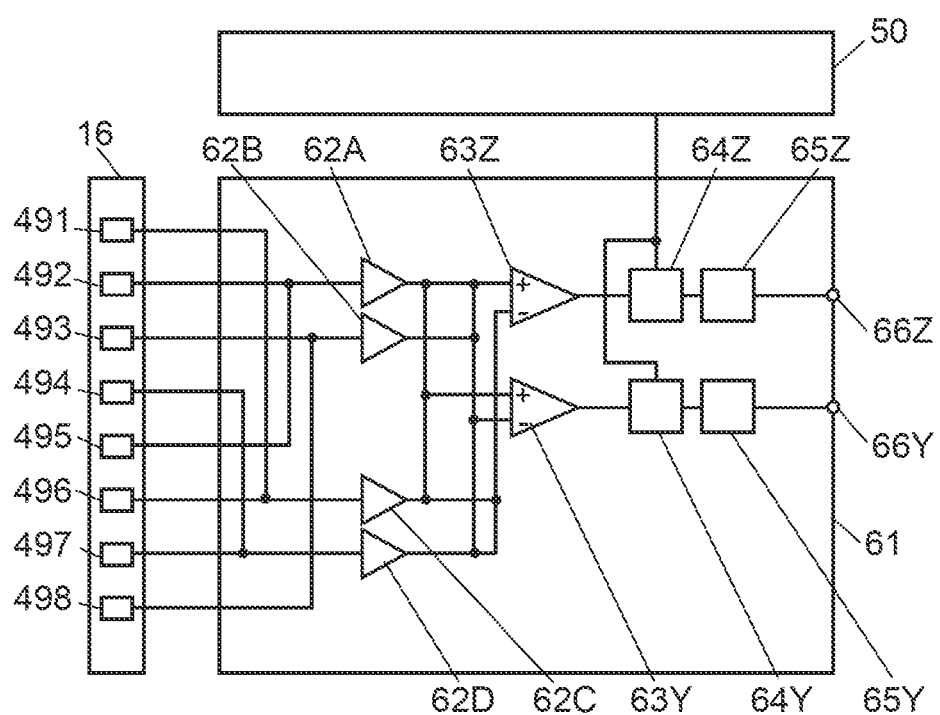
FIG. 8 shows the relation of connection between the angular velocity detection device shown in FIG. 1A and a detecting circuit.

The calculation of Mathematical Formulas (1) and (2) can be performed by detecting circuit 61 shown in FIG. 8. FIG. 8 shows the relation of connection between angular velocity detection device 16 and the detecting circuit. Detecting circuit 61 processes signals S1 to S8 output from detectors 41 to 48 of device 16.

When the phases of the drive signals are substituted into Mathematical Formula (1), the result becomes 0. Specifically, detectors 41 to 48 receive drive signals as unwanted signals, which in turn are cancelled with each other by the calculation of Mathematical Formula (1). Similarly, when the phases in the cases that each one of the angular velocities around the X and Y axes, and the accelerations in the X, Y, and Z axes directions is applied are substituted into Mathematical Formula (1), the results become 0. Thus, angular velocities around the other axes and accelerations in the directions of the other axes, which are unwanted signals, are cancelled with each other by the calculation of Mathematical Formula (1).

When the phases in the cases that each one of the drive signals, angular velocities around the X and Z axes, and accelerations in the X, Y, and Z axes directions is applied are substituted into Mathematical Formula (2), the results become 0. Thus, drive signals, angular velocity components around the other axes and acceleration components in the directions of the other axes, which are unwanted signals, are cancelled with each other by the calculation of Mathematical Formula (2).

As described above, detectors 41 to 48 are disposed symmetrically with respect to axis "C" parallel to the Y axis, and also with respect to axis "D" parallel to the X axis. This arrangement can cancel the drive signals, angular velocities around the other axes, and accelerations in the directions of the other axes, which are unwanted signals.

FIG. 8 shows the relation of connection between angular velocity detection device 16 and detecting circuit 61. Fixed portions 17A and 17B include electrode pads 491 to 498 electrically connected to detectors 41 to 48.

The output lines of electrode pads 492 and 495 are connected together and connected to I-V conversion amplifier 62A. In short, signals S2 and S5 are superimposed and sent to I-V conversion amplifier 62A. The output lines of electrode pads 493 and 498 are connected together and connected to I-V conversion amplifier 62B. In short, signals S3 and S8 are superimposed and sent to I-V conversion amplifier 62B. The output lines of electrode pads 491 and 496 are connected together and connected to I-V conversion amplifier 62C. In short, signals S1 and S6 are superimposed and sent to I-V conversion amplifier 62C. The output lines of electrode pads 494 and 497 are connected together and connected to I-V conversion amplifier 62D. In short, signals S4 and S7 are superimposed and sent to I-V conversion amplifier 62D.

The angular velocity around the Z axis is calculated as follows. The output lines of I-V conversion amplifiers 62A and 62B are connected together, whereas the output lines of I-V conversion amplifiers 62C and 62D are connected together. These signals connected together are each sent to difference amplifier 63Z. Difference amplifier 63Z outputs a signal, which is in turn detected by detector circuit 64Z using the signal from driving circuit 50, and then extracted by low-pass filter 65Z. Thus, the magnitude $\omega_z$ of angular velocity 57 around the Z axis is output from output terminal 66Z.

The angular velocity around the Y axis is calculated as follows. The output lines of I-V conversion amplifiers 62A and 62C are connected together, whereas the output lines of I-V conversion amplifiers 62B and 62D are connected together. These signals connected together are each sent to difference amplifier 63Y. Difference amplifier 63Y outputs a signal, which is in turn detected by detector circuit 64Y using the signal from driving circuit 50, and then extracted by low-pass filter 65Y. Thus, the magnitude $\omega_y$ of angular velocity 59 around the Y axis is output from output terminal 66Y.

As known from FIGS. 7 and 8, the drive signals are cancelled by connecting of electrode pads 491 through 498 before being sent to I-V conversion amplifiers 62A to 62D. Thus, the drive signals can be cancelled before being amplified by I-V conversion amplifiers 62A to 62D.

The angular velocity around the Y axis is cancelled by connecting of I-V conversion amplifiers 62A through 62D before being sent to difference amplifier 63Z for detecting the angular velocity around the Z axis. Thus, the angular velocity around the Y axis can be cancelled before being amplified by difference amplifier 63Z.

The angular velocity components around the Z axis are cancelled by connecting of I-V conversion amplifiers 62A through 62D before being sent to difference amplifier 63Y for detecting the angular velocity around the Y axis.

The acceleration in the direction of the X axis can be cancelled before being sent to I-V conversion amplifiers 62A to 62D, while the acceleration in the direction of the Y axis can be canceled before being amplified by difference amplifier 63Z.

As described above, detectors 41 to 48 are disposed symmetrically with respect to axis "C" parallel to the Y axis, and also with respect to axis "D" parallel to the X axis. This arrangement can cancel the drive signals, angular velocity components around the other axes, and acceleration components in the directions of the other axes, which are unwanted signals.

Figure 9:
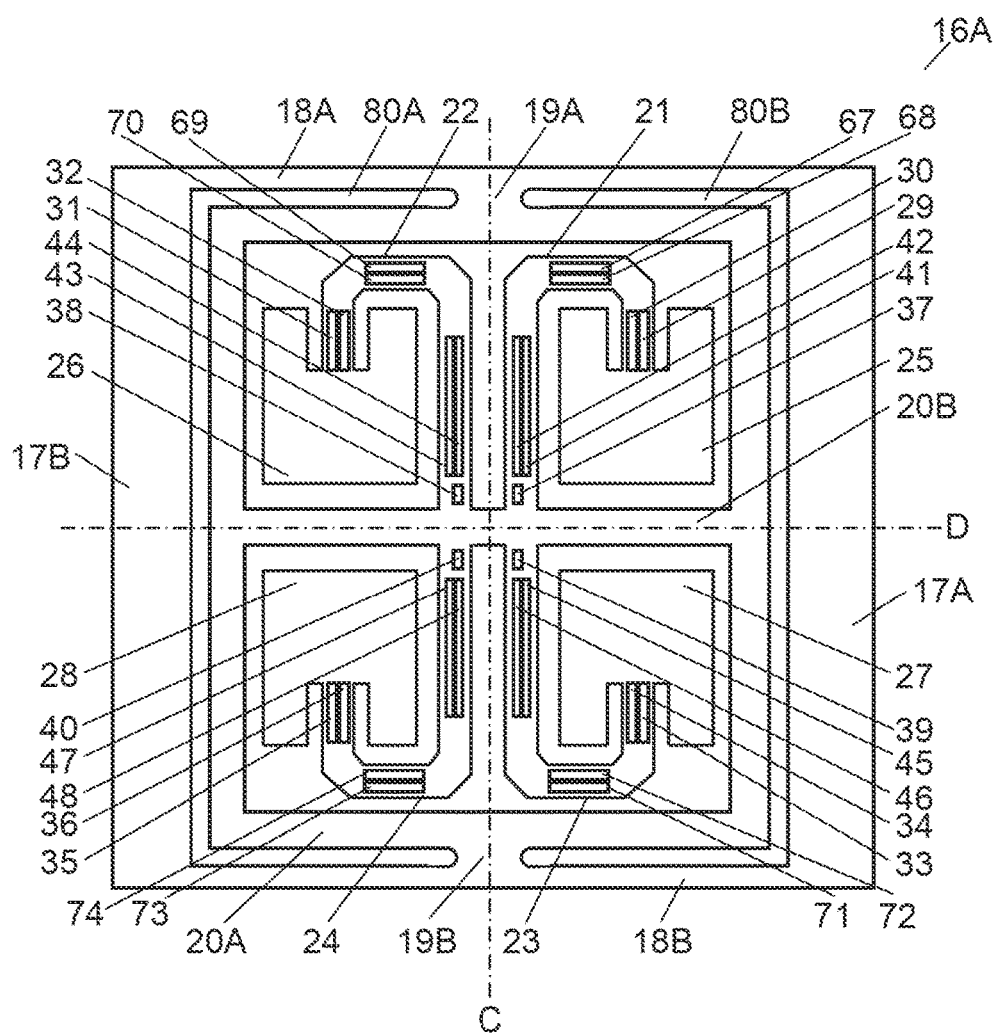
FIG. 9 is a top view of an angular velocity detection device according to another embodiment.

As shown in FIG. 9, an angular velocity detection device may further include drivers 67 to 74 on arms 21 to 24. FIG. 9 is a top view of angular velocity detection device 16A as another example of the embodiment. In device 16A, arms 21 to 24 can also vibrate in the Y axis direction, allowing the detection of the angular velocity around the X axis. The magnitude $\omega_x$ of the angular velocity around the X axis can be calculated by Mathematical Formula (3)

$$\omega_x = (S1+S2+S3+S4)-(S5+S6+S7+S8) \quad (3)$$

Thus, the provision of drivers 67 to 74 allows the detection of the angular velocities around the three axes at the same time. Furthermore, drive signals, angular velocities around the other axes, and accelerations in the directions of the other axes, which are unwanted signals, can be cancelled with each other during the detection of the angular velocity around each axis.

In angular velocity detection devices 16 and 16A according to the embodiment, arms 21 to 24 having weights 25 to 28 are supported by central beam portion 20B, which is in turn supported by inner beam portion 20A. Inner beam portion 20A is supported by outer beam portions 18A and 18B via joints 19A and 19B. This configuration enables device 16A to detect the angular velocities around the three axes at the same time, but has the disadvantage of being susceptible to acceleration and impact. For this reason, the effect of cancelling angular velocities around the other axis and accelerations in the directions of the other axes is particularly evident in the device structure of device 16A. Furthermore, the influence of the external stress can be reduced by suspending the sensing part inside the outer frame, with first slits 80A and 80B therebetween.

As shown in FIGS. 1A and 9, fixed portions 17A and 17B are disposed as an opposing pair with outer beam portions 18A and 18B therebetween. Outer beam portions 18A and 18B are disposed as an opposing pair with fixed portions 17A and 17B therebetween. In this configuration, joints 19A and 19B are preferably formed in two positions where outer beam portions 18A, 18B and inner beam portion 20A are parallel to each other. In this case, the sensing part can be suspended in the outer frame regardless of the direction in which device 16 is disposed.

Under the condition that outer beam portions 18A and 18B are subjected to no stress in the direction parallel thereto, joints 19A and 19B may be formed in two positions where fixed portions 17A, 17B and inner beam portion 20A are parallel to each other.

Figure 10:
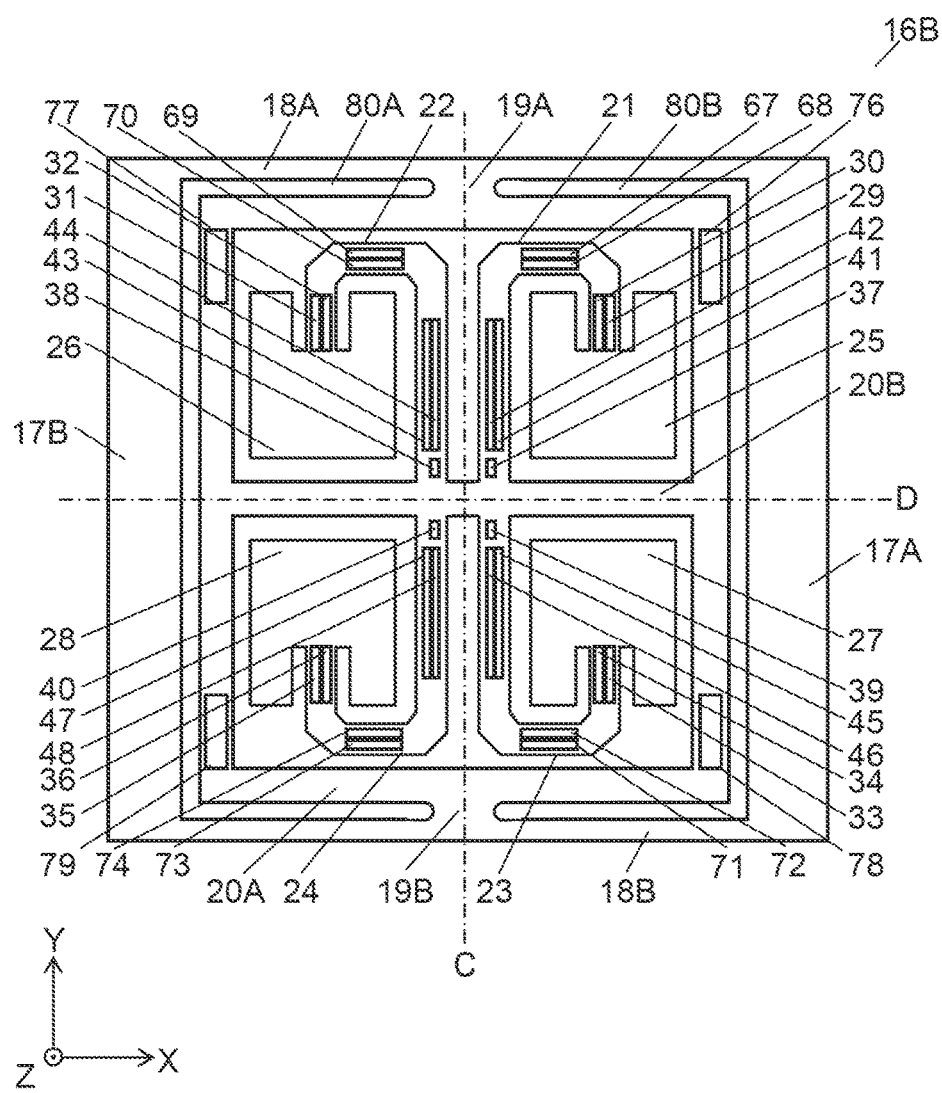
FIG. 10 is a top view of an angular velocity detection device according to another embodiment.

Another angular velocity detection device of the embodiment is now described as follows. FIG. 10 is a top view of angular velocity detection device 16B as another example of the embodiment. The following description will be focused on the difference between devices 16 and 16A shown in FIGS. 1A and 9 and device 16B.

Device 16B includes detectors 76 and 78 on the side of inner beam portion 20A that faces fixed portion 17A via first slit 80B. Detector 76 is near arm 21, and detector 78 is near arm 23. Device 16B further include detectors 77 and 79 on the side of inner beam portion 20A that faces fixed portion 17B via first slit 80A. Detector 77 is near arm 22 and detector 79 is near arm 24. Detectors 76 and 78 are disposed symmetrical to detectors 77 and 79 with respect to axis "C", while detectors 76 and 77 are disposed symmetrical to detectors 78 and 79 with respect to axis "D". Device 16B is otherwise identical to device 16A shown in FIG. 9. Detectors 76 to 79 function to detect the angular velocity around the X axis applied to device 16B.

In FIG. 11, the signals to be output from detectors 76 to 79 are referred to as S9 to S12, respectively. FIG. 11 specifically shows the following: the phases of the drive signals of the detectors; the phases in the case where angular velocities are applied around the X, Y, and Z axes; and the phases in the case where accelerations are applied in the X, Y, and Z axes directions, with respect to the phases of the drive signals provided by driving circuit 50.

From FIG. 11, the magnitude $\omega_{x2}$ of the angular velocity around the X axis can be calculated by Mathematical Formula (4)

$$\omega_{x2} = (S9+S11)-(S10+S12). \quad (4)$$

When the phases in the cases that each one of the drive signals, angular velocities around the Y and Z axes, and accelerations in the X, Y, and Z axes is applied are substituted into Mathematical Formula (4), the results become 0. Thus, angular velocities around the other axes and accelerations in the directions of the other axes, which are unwanted signals, are cancelled with each other by the calculation of Mathematical Formula (4).

As known from FIG. 11, in the case where detectors 76 to 79 are disposed on inner beam portion 20A in such a manner as to be symmetrical with respect to axes "C" and "D", no drive signals appear on detectors 76 to 79. Thus, the influence of drive signals can be eliminated by unwanted signals, without adding the signals from the plurality of detectors.

In the configuration shown in FIGS. 1A and 9, if detectors 41 to 48 are displaced with respect to the outer frame, drive signals cannot be cancelled by performing the calculation of Mathematical Formula (1), (2), or (3). In device 16B, on the other hand, even if detectors 76 to 79 are displaced with respect to the outer frame, the influence of the drive signal components can be eliminated. Similarly, angular velocities around the Y and Z axes, and acceleration in the Y axis direction, which are unwanted signals, do not appear on detectors 41 to 48, thereby providing the same effect.

As described above, detectors 76 to 79 can be disposed symmetrically with respect to axes "C" and "D" to eliminate or cancel drive signals, angular velocity components around the other axes, and acceleration components in the directions of the other axes, which are unwanted signals.

Thus, angular velocity detection device 16B extends in the X-Y plane defined by the X and Y axes where X, Y, and Z axes are orthogonal to each other. It is preferable that detectors 41 to 48 disposed on arms 21 to 24 are used as angular velocity detectors around the Z axis, and that detectors 76 to 79 for detecting the angular velocity around the X axis are disposed on the sides of inner beam portion 20A. The sides of inner beam portion 20A are parallel to fixed portions 17A and 17B.

Figure 12:
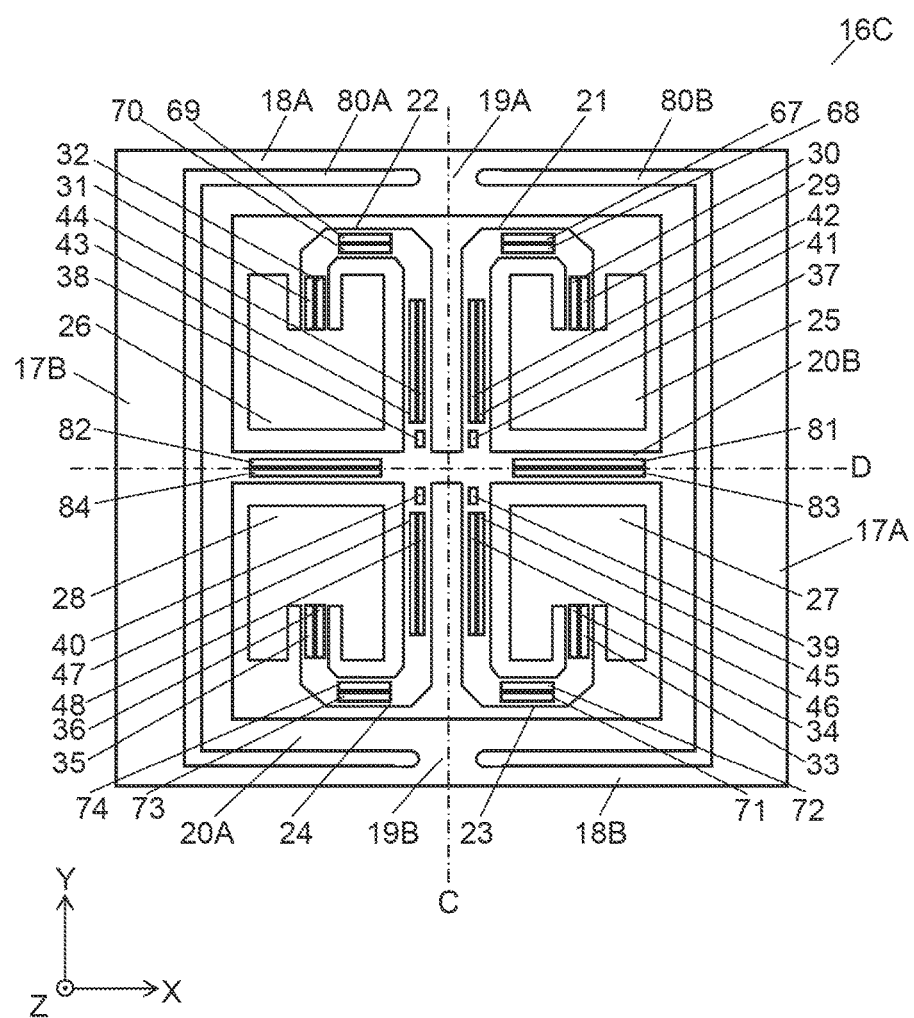
FIG. 12 is a top view of an angular velocity detection device of another embodiment.

Another angular velocity detection device of the embodiment is now described as follows. FIG. 12 is a top view of angular velocity detection device 16C according to the present embodiment. The following description will be focused on the difference between device 16C and devices 16, 16A shown in FIGS. 1A and 9.

Angular velocity detection device 16C includes detectors 81 to 84 in central beam portion 20B. Detector 81 is near arm 21, detector 82 is near arm 22, detector 83 is near arm 23, and detector 84 is near arm 24. Device 16C is otherwise identical to device 16A shown in FIG. 9. Detectors 81 and 83 are disposed symmetrical to detectors 82 and 84 with respect to axis "C", while detectors 81 and 82 are disposed symmetrical to detectors 83 and 84 with respect to axis "D". Detectors 81 to 84 function to detect the angular velocity around the Y axis applied to device 16C.

In FIG. 13, the signals to be output from detectors 81 to 84 are referred to as signals S13 to S16, respectively. FIG. 13 specifically shows the following: the phases of the drive signals of the detectors; the phases in the case where angular velocities are applied around the X, Y, and Z axes; and the phases in the case where accelerations are applied in the X, Y, and Z axes directions, with respect to the phases of the drive signals provided by driving circuit 50.

From FIG. 13, the magnitude $\omega_{y2}$ of the angular velocity around the Y axis can be calculated by Mathematical Formula (5)

$$\omega_{y2}=(S13+S15)-(S14+S16) \qquad (5)$$

When the phases in the cases that each one of the drive signals, angular velocities around the X and Z axes, and accelerations in the directions of the X, Y, and Z axes is applied are substituted into Mathematical Formula (5), the results become 0. Thus, angular velocities around the other axes and accelerations in the directions of the other axes, which are unwanted signals, are cancelled with each other by the calculation of Mathematical Formula (5).

As known from FIG. 13, in the case where detectors 81 to 84 are disposed on central beam portion 20B in such a manner as to be symmetrical with respect to axes "C" and "D", no drive signals appear on detectors 81 to 84. Thus, the influence of drive signals can be eliminated by unwanted signals, without adding the signals from the plurality of detections. In the configuration shown in FIGS. 1A and 9, if detectors 41 to 48 are displaced with respect to the outer frame, drive signals cannot be cancelled by performing the calculation of Mathematical Formula (1), (2), or (3). In device 16C, on the other hand, even if detectors 81 to 84 are displaced with respect to the outer frame, the influence of the drive signal components can be eliminated. Similarly, angular velocities around the X and Z axes, and acceleration in the direction of the X axis, which are unwanted signals, do not appear on detectors 81 to 84, thereby providing the same effect.

As described above, detectors 81 to 84 can be disposed symmetrically with respect to axes "C" and "D" to eliminate or cancel drive signals, angular velocity components around the other axes, and acceleration components in the directions of the other axes, which are unwanted signals.

Figure 14:
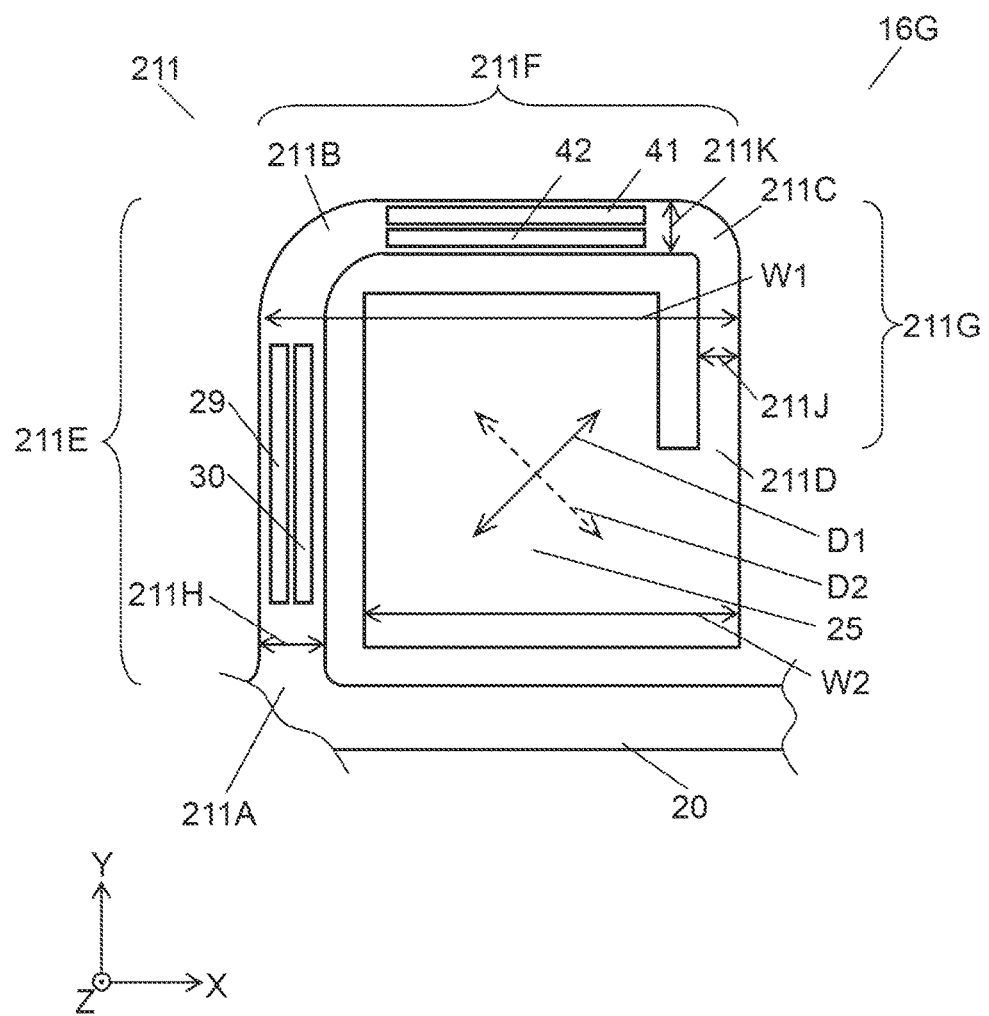
FIG. 14 is a partial top view of an angular velocity detection device of another embodiment.

Another angular velocity detection device of the embodiment is now described as follows. FIG. 14 is a partial top view of angular velocity detection device 16G of the embodiment. The following description will be focused on the difference between device 16G and devices 16, 16A shown in FIGS. 1A and 9.

Angular velocity detection device 16G differs from angular velocity detection device 16 shown in FIG. 1A in the shape of arms and the arrangement of drivers and detectors. FIG. 14 shows the shape of first arm (hereinafter, arm) 211 as an example. Although not shown, second, third, and fourth arms, which respectively correspond to arms 22, 23, and 24 shown in FIG. 1A, have the same shape as arm 211. These arms have the same symmetrical relationship as in angular velocity detection device 16.

Arm 211 includes first end 211A, first corner 211B, and second corner 211C. First end 211A is connected to central beam portion 20B. In short, arm 211 has first arm portion 211E, second arm portion 211F, and third arm portion 211G, which together form the shape of the letter "J". First arm portion 211E extends between first end 211A and first corner 211B. Second arm portion 211F extends between first corner 211B and second corner 211C. Third arm portion 211G extends between second corner 211C and second end 211D. Second end 211D is connected to weight 25. Weight 25 is connected to arm 211 in such a manner that an extension of the outer side of third arm portion 211G is coincident with one side of weight 25 having a substantially square shape.

Arm 211 and weight 25 can perform drive oscillation in the X-Y plane, and can bend in the Z axis direction. Arm 211 and weight 25 are made of the same material as those shown in FIG. 1A.

Drivers 29 and 30 are disposed on first arm portion 211E. Detectors 41 and 42 are disposed on second arm portion 211F. Detectors 41, 42 and drivers 29, 30 have the same configuration as those shown in FIG. 1A. Arm 211 can perform drive oscillation in the X-Y plane by applying anti-phase voltages to drivers 29 and 30, respectively.

The principle of this angular velocity detection device is now described. When an external driving circuit (not shown) applies an AC voltage having a resonance frequency of drive oscillation to drivers 29 and 30, arm 211 and weight 25 perform drive oscillation along a drive oscillation direction D1 in the X-Y plane. If an angular velocity is applied around the Z axis at this moment, Coriolis force is generated in the direction at right angles with the drive oscillation direction D1. The Coriolis force excites detection oscillation in a detection oscillation direction D2 in synchronization with the drive oscillation. Detectors 41 and 42 detect the distortion of arm 211 caused by the detection oscillation as a displacement of arm 211, thereby detecting the angular velocity.

In general, the resonance frequency of detection oscillation in the detection oscillation direction D2 is set close to the resonance frequency of drive oscillation in the drive oscillation direction D1. The reason for this is as follows. The detection oscillation generated when an angular velocity is applied is in synchronization with drive oscillation. As a result, as the resonance frequency of detection oscillation is closer to a resonance frequency of drive oscillation, the detection oscillation is excited more.

However, since the drive oscillation direction D1 and the detection oscillation direction D2 are different from each other, it is difficult to make the resonance frequency of drive oscillation and that of detection oscillation close to each other. For example, when the resonance frequency of drive oscillation in angular velocity detection device 16 shown in FIG. 1A is designed to be about 40 kHz, the resonance frequency of detection oscillation is about 65 kHz. This means that these resonance frequencies are 25 kHz apart from each other, decreasing the sensitivity of the angular velocity around the Z axis.

In contrast, in the configuration shown in FIG. 14, the length W1 of arm 211 in the X axis direction is set larger than the length W2 of weight 25 in the X axis direction. As a result, when an angular velocity is applied around the Z axis during the detecting resonance oscillation, the stiffness can be lower at second corner 211C and its vicinity where stress tends to be concentrated, allowing the resonance frequency of the detecting resonance oscillation to be lower. In an angular velocity detection device with this configuration, when the resonance frequency of drive oscillation is 40 kHz, the resonance frequency of detection oscillation can be about 45 kHz. Thus, the difference between these resonance frequencies can be 5 kHz or less, thereby allowing the angular velocity around the Z axis to be detected at about five times as high sensitivity as angular velocity detection device 16.

As shown in FIG. 14, width 211K of second arm portion 211F may be smaller than width 211H of first arm portion 211E. With this configuration, the stiffness can be low at second corner 211C and its vicinity, allowing the resonance frequencies of drive oscillation and detection oscillation to be close to each other. Width 211J of third arm portion 211G may be smaller than width 211K of second arm portion 211F. Alternatively, first corner 211B may have a radius of curvature larger than that of second corner 211C. With these configurations, the resonance frequencies of drive oscillation and detection oscillation can be close to each other for the same reason. These configurations are effective alone, but the resonance frequencies of drive oscillation and detection oscillation can be much closer when used in combination. This can further increase the sensitivity of the angular velocity around the Z axis.

When arm 211 and weight 25 are made to perform drive oscillation in the drive oscillation direction D1, the distortion tends to be concentrated in first arm portion 211E. Therefore, the provision of drivers 29 and 30 in first arm portion 211E can improve drive efficiency.

Similarly, when arm 211 and weight 25 are made to perform detection oscillation in the detection oscillation direction D2, the distortion tends to be concentrated in second arm portion 211F. Therefore, the provision of detectors 41 and 42 in second arm portion 211F can improve detection efficiency. Arm 211 performs drive oscillation along the drive oscillation direction D1, and performs detection oscillation along the detection oscillation direction D2. Hence, detectors 41 and 42 may be disposed on third arm portion 211G to detect the detection oscillation.

As described above, the resonance frequency of the drive oscillation and that of the detection oscillation of an angular velocity around the Z axis can be close to each other in the angular velocity detection device. As a result, the angular velocity around the Z axis can be detected at a high sensitivity.

Figure 15:
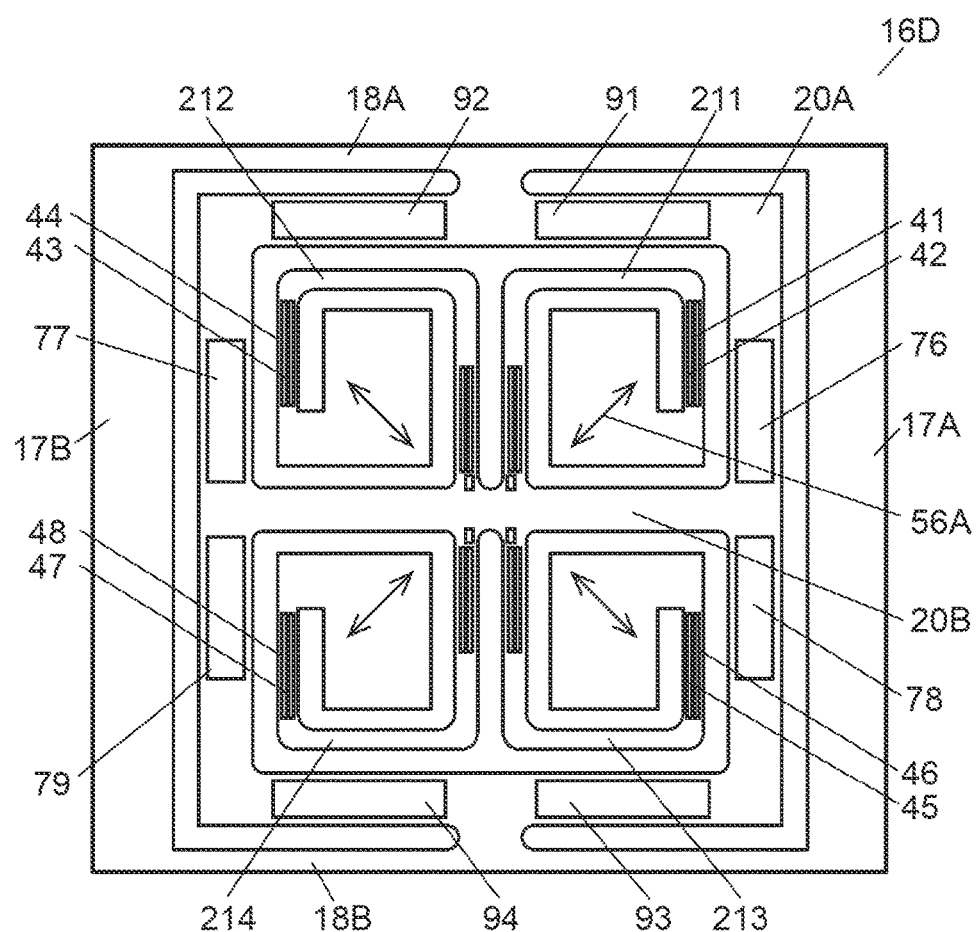
FIG. 15 is a top view of an angular velocity detection device of another embodiment.

Another angular velocity detection device of the embodiment is now described. FIG. 15 is a top view of angular velocity detection device 16D according to the embodiment. The following description will be focused on the difference between device 16D and device 16G shown in FIG. 14.

Angular velocity detection device 16D includes detectors 91 to 94 for detecting an angular velocity around the Y axis on the sides of inner beam portion 20A. The sides are parallel to outer beam portions 18A and 18B. Device 16D is otherwise identical to device 16G.

Thus, detectors 91 to 94 can be disposed on the sides of inner beam portion 20A that are parallel to outer beam portions 18A and 18B to make central beam portion 20B thin, allowing unwanted resonance frequencies in the X-Y plane to be low. This can increase the difference between the unwanted resonance frequencies and the resonance frequency of drive oscillation, allowing accurate detection of detection oscillation based on drive oscillation.

This configuration can also be applied to angular velocity detection devices 16, 16A, 16B, and 16C shown in FIGS. 1A, 9, 10, and 12, respectively. In short, detectors 81 to 84 shown in FIG. 12 can be replaced by detectors 91 to 94.

Thus, when X, Y, and Z axes are orthogonal to each other, angular velocity detection device 16D extends in the X-Y plane defined by the X and Y axes. It is preferable that detectors 41 to 48 disposed on arms 211 to 214 are used as angular velocity detectors around the Z axis, and that detectors 91 to 94 for detecting the angular velocity around the X axis are disposed on the sides of inner beam portion 20A that are parallel to outer beam portions 18A and 18B.

Detectors 76 to 79 for detecting the angular velocity around the X axis are disposed on the sides of inner beam portion 20A. is the sides are parallel to fixed portions 17A and 17B. This configuration has an effect similar to the configuration shown in FIG. 9.

Figure 16A:
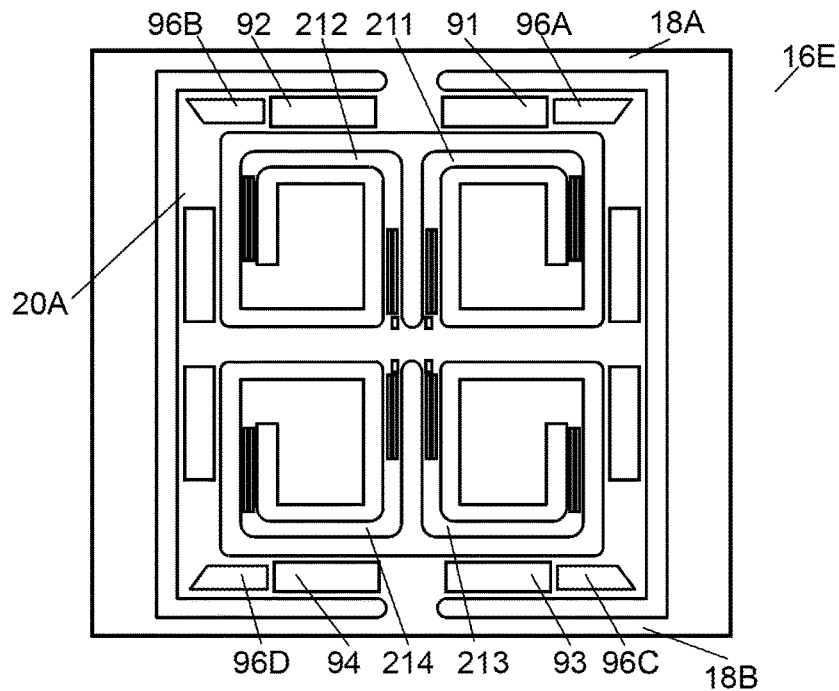
FIG. 16A is a top view of an angular velocity detection device of another embodiment.
Figure 16B:
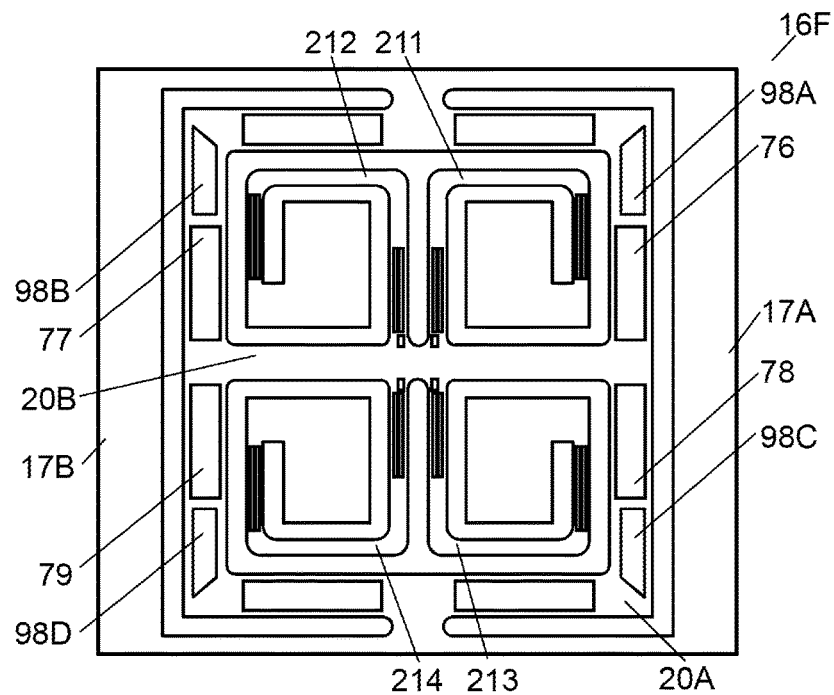
FIG. 16B is a top view of an angular velocity detection device of another embodiment.

Other angular velocity detection devices of the embodiment are now described as follows. FIGS. 16A and 16B are top views of angular velocity detection devices 16E and 16F, respectively, of the embodiment. The following description will be focused on the difference between devices 16E, 16F and device 16D shown in FIG. 15.

In angular velocity detection device 16E shown in FIG. 16A, inner beam portion 20A has second slits 96A to 96D adjacent to detectors 91 to 94 disposed on the sides of inner beam portion 20A that are parallel to outer beam portions 18A and 18B.

In order to improve the sensitivity of detectors 91 to 94, detectors 91 to 94 need to have a larger area. However, an increase in the width of inner beam portion 20A for the purpose of increasing the area of detectors 91 to 94 would result in an increase in the stiffness of inner beam portion 20A. This would then cause the unwanted resonance frequencies of arms 211 to 214 to get closer to the drive frequency, thereby inducing an unstable vibrational state and decreasing measurement accuracy.

To avoid this situation, the configuration shown in FIG. 16A includes second slits 96A to 96D. This can decrease the stiffness of inner beam portion 20A, while increasing the area of detectors 91 to 94 relative to the area of the top surface of inner beam portion 20A. As a result, the difference between the drive frequency of arms 211 to 214 and the unwanted resonance frequencies can be increased while improving the sensitivity of detectors 91 to 94.

Inner beam portion 20A is stiffer near the corners than near the center of each side. For this reason, in order to increase the difference between the drive frequency of arms 211 to 214 and the unwanted resonance frequencies, it is preferable to form second slits 96A to 96D near the corners of inner beam portion 20A.

It is further preferable that second slits 96A to 96D are right trapezoids when viewed from the above, each having an upper base, a lower base longer than the upper base, and an oblique side connecting the upper and lower bases and that the lower base is on the outer side in the direction of the width of inner beam portion 20A, and the oblique side is near a corner of inner beam portion 20A. Second slits 96A to 96D having such a shape facilitate the adjustment of the stiffness of inner beam portion 20A and the sensitivity of detectors 91 to 94.

In angular velocity detection device 16F shown in FIG. 16B, on the other hand, inner beam portion 20A has second slits 98A to 98D adjacent to detectors 76 to 79 disposed on the sides of inner beam portion 20A. The sides are parallel to fixed portions 17A and 17B.

Similar to the case shown in FIG. 16A, in order to improve the sensitivity of detectors 76 to 79, detectors 76 to 79 need to have a larger area. However, an increase in the width of inner beam portion 20A for the purpose of increasing the area of detectors 76 to 79 would result in an increase in the stiffness of inner beam portion 20A. This would then cause the unwanted resonance frequencies of arms 211 to 214 to get closer to the drive frequency, thereby inducing an unstable vibrational state and decreasing measurement accuracy.

More specifically, the difference between the drive frequency of arms 211 to 214 and the unwanted resonance frequencies is 500 Hz or above, and more preferably, 1000 Hz or above. Device 16F needs to be reduced in size with decreasing size of the apparatuses on which device 16F is mounted. However, as device 16F is smaller, its mass is smaller, causing the unwanted resonance frequencies to increase and get closer to the drive frequency.

To avoid this situation, the configuration shown in FIG. 16B is provided with second slits 98A to 98D. This can decrease the stiffness of inner beam portion 20A, while increasing the area of detectors 76 to 79 relative to the area of the top surface of inner beam portion 20A. As a result, the difference between the drive frequency of arms 211 to 214 and the unwanted resonance frequencies can be increased while improving the sensitivity of detectors 76 to 79.

Specifically, in the case where angular velocity detection device 16F has a size of about 2.5×2.5 mm, its base is made of 150 μm thick Si, and its drive frequency is about 40 kHz, the frequency difference is about 1000 Hz. This effect is provided independently of the effect of the presence of first slits 80A and 80B.

Inner beam portion 20A is stiffer near the corners than near the center of each side. For this reason, in order to increase the difference between the drive frequency of arms 211 to 214 and the unwanted resonance frequencies, it is preferable to form second slits 98A to 98D near the corners of inner beam portion 20A. In the configuration shown in FIG. 16B, there are no joints between fixed portions 17A, 17B and inner beam portion 20A, allowing high detection sensitivity at the position of inner beam portion 20A near central beam portion 20B. Thus, detectors 76 to 79 can detect the angular velocity around the X axis at a high sensitivity by the arrangement of detectors 76 to 79 in the vicinity of the regions of inner beam portion 20A where inner beam portion 20A is connected to central beam portion 20B. Second slits 98A to 98D can be formed near the corners of inner beam portion 20A where little contribution is made to improve the sensitivity.

It is more preferable that second slits 98A to 98D are right trapezoids when viewed from the above, each having an upper base, a lower base longer than the upper base, and an oblique side connecting the upper and lower bases and that the lower base is on the outer side in the direction of the width of inner beam portion 20A, and the oblique side is near a corner of inner beam portion 20A. Second slits 98A to 98D having such a shape facilitate the adjustment of the stiffness of inner beam portion 20A and the sensitivity of detectors 76 to 79. When needed, both second slits 96A to 96D shown in FIG. 16A and second slits 98A to 98D shown in FIG. 16B may be formed.

The configuration shown in FIGS. 16A and 16B can also be applied to angular velocity detection devices 16, 16A, 16B, and 16C shown in FIGS. 1A, 9, 10, and 12, respectively. In short, detectors 81 to 84 shown in FIG. 12 can be replaced by detectors 91 to 94, and in addition, second slits 96A to 96D can be formed. Furthermore, in the configuration shown in FIG. 10, detectors 76 to 79 may be disposed close to central beam portion 20B, and in addition, second slits 98A to 98D may be formed.

In the above description, the angular velocity sensor includes driving circuit 50, detecting circuit 61, and one of angular velocity detection devices 16 to 16F. However, driving circuit 50 and detecting circuit 61 do not have to be incorporated into the angular velocity sensor. At least either driving circuit 50 or detecting circuit 61 can be incorporated into an apparatus where the angular velocity sensor is installed.

As described above, the angular velocity sensors of the embodiments are useful for mobile terminals and vehicles because it can cancel unwanted signals due, for example, to acceleration, thereby having high detection accuracy of the angular velocity.

The invention claimed is:

1. An angular velocity detection device comprising:
   a first fixed portion,
   a second fixed portion,
   a first beam portion connected to the first fixed portion,
   a second beam portion connected to the second fixed portion,
   a sensing part connected to the first beam portion and the second beam portion,
   a detector portion disposed in the sensing portion, a first slit disposed between the sensing part and the first fixed portion,
a second slit disposed between the sensing part and the second fixed portion,
wherein the sensing part comprises:
a third beam portion connected to the first beam portion,
a fourth beam portion connected to the second beam portion and extending along a same direction which the third beam portion extends along,
a fifth beam portion connected to the third beam portion and the fourth beam portion and extending along a direction orthogonal to a direction which the third beam portion extends along,
a sixth beam portion connected to the third beam portion and fourth beam portion and extending along a direction orthogonal to the direction which the third beam portion extends along and parallel to the fifth beam portion,
a central beam portion connected to the fifth beam portion and the sixth beam portion, a seventh beam portion, an eighth beam portion, a ninth beam portion, and a tenth beam portion each connected to the central beam portion, and
a first mass portion, a second mass portion, a third mass portion, and a fourth mass portion connected to a respective one of the seventh beam portion, the eighth beam portion, the ninth beam portion, and the tenth beam portion,
wherein the detector portion comprises:
a first angular velocity detector portion, disposed on the third beam portion and the forth beam portion, that detects an angular velocity around a first axis, and
a second angular velocity detector portion, disposed on the fifth beam portion and the sixth beam portion, that detects an angular velocity around a second axis orthogonal to the first axis.

2. The angular velocity detection device according to claim 1, wherein the detector portion comprises:
a third angular velocity detector portion that detects an angular velocity around a third axis, orthogonal to the first axis and the second axis.

3. The angular velocity detection device according to claim 1, wherein:
X, Y, and Z axes are orthogonal to each other,
the first beam portion extends along the X- axis, and
the second beam portion extends along the X-axis.

4. The angular velocity detection device according to claim 1, wherein:
the sixth beam portion extends along a direction orthogonal to a direction which the fourth beam portion extend along.

5. The angular velocity detection device according to claim 1, further comprising:
a third fixed portion, and
a fourth fixed portion, wherein
the third fixed portion is connected to the first fixed portion via the first beam portion, and the fourth fixed portion is connected to the second fixed portion via the first beam portion.

6. The angular velocity detection device according to claim 5, wherein:
a first imaginary line is parallel to the first beam portion and crosses a center of the angular velocity detection device in a plane view,
a second imaginary line crosses an inside edge of the first beam portion which is closest to the first imaginary line in the plane view, a third imaginary line crosses an inside edge of the second beam portion which is closest to the first imaginary line in the plane view,
a center of the first fixed portion and a center of the third fixed portion are both located between the first imaginary line and the second imaginary line in the plane view, and
a center of the second fixed portion and a center of the fourth fixed portion are both located between the first imaginary line and the third imaginary line in the plane view.

7. The angular velocity detection device according to claim 1, wherein:
each of the seventh beam portion, the eighth beam portion, the ninth beam portion, and the tenth beam portion has a first portion, a second portion, and third portion, and
wherein:
the first portion is parallel to the third portion,
the second portion is orthogonally connected to the first portion, and
the third portion is orthogonally connected to the second portion.

8. An angular velocity detection sensor comprising the angular velocity detection device according to claim 1.

9. An angular velocity detection device comprising:
a first mass portion, a second mass portion, a third mass portion and a fourth mass portion,
a frame portion connected to the first mass portion, the second mass portion, the third mass portion and the fourth mass portion via a plurality of beam portions,
a first angular velocity detector portion disposed on the frame portion that detects an angular velocity around a first axis, and
a second angular velocity detector portion disposed on the frame portion that detects an angular velocity around a second axis orthogonal to the first axis,
wherein the frame portion comprises a first slit, a second slit, a third slit and a fourth slit,
wherein the first angular velocity detector portion comprises a first portion and a second portion, the first portion and the second portion of the first angular velocity detector portion disposed on opposite positions on the frame portion, and
wherein the second angular velocity detector portion comprises a first portion and a second portion, the first portion and the second portion of the second angular velocity detector portion disposed on opposite positions on the frame portion.

10. The angular velocity detection device according to claim 9, wherein:
the first slit, the second slit, the third slit and the fourth slit are trapezoids when viewed from the above.

11. The angular velocity detection device according to claim 9, wherein:
the first slit, the second slit, the third slit and the fourth slit are right trapezoids when viewed from the above.

12. The angular velocity detection device according to claim 9, wherein:
the first slit, the second slit, the third slit and the fourth slit each comprise an upper base, a lower base longer than the upper base, and an oblique side connecting the upper and lower bases.

13. The angular velocity detection device according to claim 12, wherein:
each of the lower bases is on an outer side in a direction of a width of the frame portion.

14. The angular velocity detection device according to claim 12, wherein:
 each of the oblique sides is directed to a corner of the frame portion.

15. The angular velocity detection device according to claim 9, wherein:
 the first slit, the second slit, the third slit and the fourth slit each comprise a corner directed to a corner of the frame portion.

16. The angular velocity detection device according to claim 9, wherein:
 the first angular velocity detector portion and the second angular velocity detector portion comprise a piezoelectric layer sandwiched between electrodes.

17. An angular velocity detection sensor comprising:
 the angular velocity detection device according to claim 9,
 a driving circuit outputting a signal to the angular velocity detection device, and
 a detection circuit receiving a signal from the angular velocity detection device.

18. An angular velocity detection device comprising:
 a first mass portion, a second mass portion, a third mass portion and a fourth mass portion,
 a frame portion connected to the first mass portion, the second mass portion, the third mass portion and the fourth mass portion via a plurality of beam portions, being capable of being moved by angular velocity applied to the angular velocity detection device,
 wherein the frame portion comprises a first slit, a second slit, a third slit and a fourth slit, and
 wherein a first angular velocity detector portion to detect an angular velocity around a first axis and a second angular velocity detector portion to detect an angular velocity around a second axis orthogonal to the first axis are disposed on the frame portion.

19. The angular velocity detection device according to claim 18, wherein:
 the first slit, the second slit, the third slit and the fourth slit are trapezoids when viewed from the above.

20. The angular velocity detection device according to claim 18, wherein:
 the first slit, the second slit, the third slit and the fourth slit are right trapezoids when viewed from the above.

21. The angular velocity detection device according to claim 18, wherein:
 the first slit, the second slit, the third slit and the fourth slit each comprise an upper base, a lower base longer than the upper base, and an oblique side connecting the upper and lower bases.

22. The angular velocity detection device according to claim 21, wherein:
 each of the lower bases is on an outer side in a direction of a width of the frame portion.

23. The angular velocity detection device according to claim 21, wherein:
 each of the oblique sides is directed to a corner of the frame portion.

24. The angular velocity detection device according to claim 18, wherein:
 the first slit, the second slit, the third slit and the fourth slit each comprise a corner directed to a corner of the frame portion.

25. An angular velocity detection sensor comprising:
 the angular velocity detection device according to claim 18
 a driving circuit outputting a signal to the angular velocity detection device, and
 a detection circuit receiving a signal from the angular velocity detection device.

* * * * *